(12) United States Patent
Müller

(10) Patent No.: US 6,677,575 B2
(45) Date of Patent: Jan. 13, 2004

(54) OBJECT DETECTING DEVICE HAVING ACTIVATED LIGHT SOURCE

(75) Inventor: Josef Müller, Lakewood, NY (US)

(73) Assignee: Acu-Rite Inc., Jamestown, NY (US)

( * ) Notice: Subject to any disclaimer, the term of this patent is extended or adjusted under 35 U.S.C. 154(b) by 0 days.

(21) Appl. No.: 10/151,729

(22) Filed: May 17, 2002

(65) Prior Publication Data

US 2003/0213894 A1 Nov. 20, 2003

(51) Int. Cl.[7] .................................................. H01J 40/14
(52) U.S. Cl. ................................... 250/221; 250/227.14
(58) Field of Search ............................. 250/221, 222.1, 250/201.1, 201.3, 227.14, 227.24, 559.4; 340/555–557

(56) References Cited

U.S. PATENT DOCUMENTS 4,314,760 A * 2/1982 Hodge et al. ............... 356/4.07

FOREIGN PATENT DOCUMENTS

| DE | 28 13 853 | 10/1979 |
| DE | 295 18 671 | 4/1996 |

* cited by examiner

Primary Examiner—Que T. Le
(74) Attorney, Agent, or Firm—Brinks Hofer Gilson & Lione

(57) ABSTRACT

An object detecting device that includes a housing, a light source at or in the housing, for indicating that an object has been sensed, a probe linked to the light source, for sensing the object and for activating the light source when the object is sensed and a light detector assembly attached to the housing for coupling the light source with a processing unit.

29 Claims, 5 Drawing Sheets

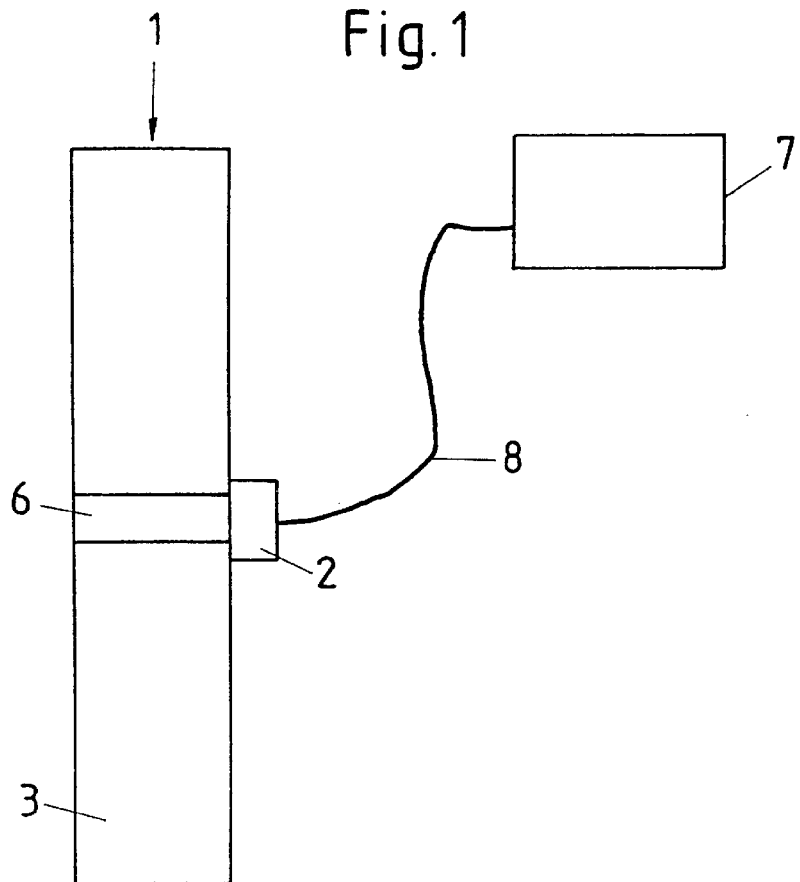
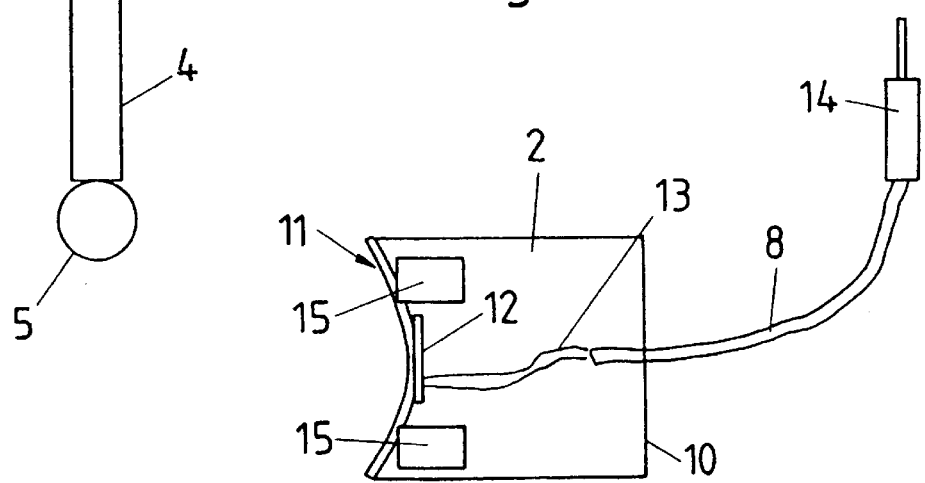

OBJECT DETECTING DEVICE HAVING ACTIVATED LIGHT SOURCE

BACKGROUND OF THE INVENTION

1. Field of Invention

The present invention relates to an object detecting device for sensing an object, such as a workpiece placed on a workpiece holder of a machine tool.

2. Discussion of Related Art

Object detecting devices, also sometimes referred to as edge finders are known, which detect an object, and in particular an electrically conductive workpiece, upon contacting the object. Conventional edge finders have a cylindrical housing of metal which is inserted into the tool holder of a machine tool. The tip of the edge finder is formed by a spherical probe. Inside the edge finder, a power supply is provided. Also, a light source is provided which emits light upon detection of a workpiece placed on a workpiece holder of the machine tool.

More specifically, the power supply, the light source, the probe, the tool holder, the workpiece holder and the workpiece form part of an open electrical circuit. When the probe contacts the workpiece, the electrical circuit is closed and the light source activated.

Such edge finders are known from DE-A-2813853 and DE-U1-29518671.

In order to process the detection of a workpiece, for example to determine the position of the workpiece on the workpiece holder or the dimensions of the workpiece, an operator has to operate an external processing unit upon cognition of light emitted by the light source. In response thereto, the processing unit may store current parameters of the machine tool, such as the current position of the tool holder. Such processing is inexact since it depends on the manual operation by the operator. It is also inconvenient because it constantly involves the operator.

Accordingly, it is an object of the present invention is to provide a simple sensing device which does not require manual operation in order to process object detections.

Another object of the present invention is to provide an object detecting device which supplements existing sensing devices in order to provide for automatic detection processing.

Other objects of the present invention will become apparent from the following description of the present invention and embodiments thereof.

BRIEF SUMMARY OF THE INVENTION

One aspect of the present invention regards a detector assembly for sensing an object, the detector assembly includes an object sensing component that has a probe for contacting an object and a light source that emits light upon the probe contacting the object. A light detector is attached to the object sensing component, wherein the light detector detects the emitted light and generates an electrical signal.

The object detecting device according to the present invention thus provides for an automatic detection of light emitted by the light source when a workpiece is detected. Responsive to the light detection, the detector generates an output signal which is transmitted to an external processing unit for further signal processing (e.g. a computer). For example, the processing unit includes a counter of a position measurement system of a machine tool which measures the position of a workpiece holder relative to a tool holder by increments. An output signal of the detector halts the counting or sets the counter to a stored numeric value. Alternatively, the processing unit may process additional signals provided by the machine tool in order to determine the position of the workpiece on the workpiece holder, or the workpiece dimensions.

Such automatic detection does away with the disadvantages resulting from a manual operation of the external processing device upon user cognition of an activation of the light source.

In one embodiment of the present invention, the light detector is contained in the light detector housing that is attachable to an object sensing component housing. The light detector housing is attachable to the object sensing component housing by magnetic force. This provides for an easy assembly and disassembly of an object sensing component, which includes an object sensing probe and the object sensing component housing, and a detector assembly, which includes the light detector and the light detector housing. Also, the relative position of the detector assembly to the object sensing component is easily adjustable to ensure that light emitted by the light source is reliably detected by the light detector.

In another embodiment of the present invention, a clamp is mounted to the light detector housing for clasping the object sensing component housing. Thereby, a simple mechanical connection of the detector assembly and the object sensing component is provided which is easy to manufacture.

In another embodiment of the present invention, a lens in the light detector housing is arranged before the light detector to focus the light from the light source on the light detector.

In another embodiment, the light detector housing includes having the aperture located in between the light detector and the light source when the light detector housing is attached to the object sensing component housing.

The aperture ensures that no light can impinge on the light detector when the detector assembly is disassembled from the object sensing component, thus preventing false detections which may result from ambient light entering the light detector housing.

Preferably, the aperture is formed by at least one shutter operable by a force acting on at least one actuator associated with the shutter, wherein the actuator projects from the light detector housing such that a force is applied thereon by the object sensing component housing when the light detector housing is attached thereto.

Thus, automatic mechanical operation (i.e. opening and closing) of the aperture is effected by assembly/disassembly of the detector assembly and the object sensing component. Such an aperture is simple and inexpensive.

A second aspect of the present invention regards an object detecting device for sensing an object, the object detecting device including an object sensing component housing and a light source arranged at or in the object sensing component housing. A probe is arranged at the object sensing component housing and contacting an object thereby to detect the presence of the object and causing the light source to emit light. A light detector detects the light and includes a light detector housing attached to the sensing device housing, the light detector connected to a processing unit for processing the light detected by the light detector.

Such an object detecting device may also be referred to as an edge finder.

The object detecting device of this aspect of the present invention may be obtained by converting existing conventional edge finders. Accordingly, the advantages of an automatic light detection are provided simply without requiring full replacement of existing equipment.

The light detector housing may be attachable to the object sensing component housing by magnetic force. In particular, the object sensing component housing may be of metal or may include a metal portion in the proximity of the light source, and the light detector housing may include one or more magnets to interact with the metal object sensing component housing or the metal portion of the object sensing component housing. Thereby, a simple connection of the light detector housing and the object sensing component housing is provided which is convenient to handle.

Preferably, those sides of the object sensing component housing and the light detector housing which are to contact one another for attachment of the light detector housing to the object sensing component housing are shaped complementarily to each another. Thereby, a reliable connection between the light detector housing and the object sensing component housing is provided. Also, ambient light is prevented from entering the light detector housing at the (preferably transparent) outer wall of the light detector housing which abuts the object sensing component housing.

In particular, the object sensing component housing may be cylindrical, and that side of the light detector housing which abuts the object sensing component housing is curved inversely to the corresponding portion of the cylindrical object sensing component housing. This embodiment reflects that most existing object detecting devices are cylindrical. Thus, conversion of existing object detecting devices is facilitated.

In one embodiment, the object sensing component housing includes a window, and the light source is arranged within the object sensing component housing to emit light through the window. The window may extend all around the circumference of the object sensing component housing. Thus, the positional adjustment of the object detecting device is facilitated. Alternatively, one or more separate windows may be arranged around the circumference of the object sensing component housing.

The light detector may be a photo transistor, a photodiode or a photoresistor which is sensitive for the visible light of the light source.

Another aspect of the present invention regards an object detecting device for sensing an object, the device including a housing, a light source arranged at or in the housing, for indicating that an object has been sensed. A probe is arranged at the housing and contacting the object thereby to detect the presence of the object and causing the light source to emit light. A light detector is attached to the housing at a position to detect the light emitted from the light source.

Another aspect of the present invention regards an object detecting device that includes a housing and a light source at or in the housing, for indicating that an object has been sensed. A probe is linked to the light source, for sensing the object and for activating the light source when the object is sensed and a light detector assembly attached to the housing for coupling the light source with a processing unit.

Additional embodiments and advantages of the present invention will become apparent from the following description and the appended claims when considered with the accompanying drawings.

BRIEF DESCRIPTION OF THE DRAWINGS

FIG. 1 illustrates an embodiment of an object detecting device according to the present invention;

FIG. 2 illustrates an embodiment of a detector assembly according to the present invention to be used with the object detecting device of FIG. 1;

DETAILED DESCRIPTION OF THE INVENTION

Figure 5:
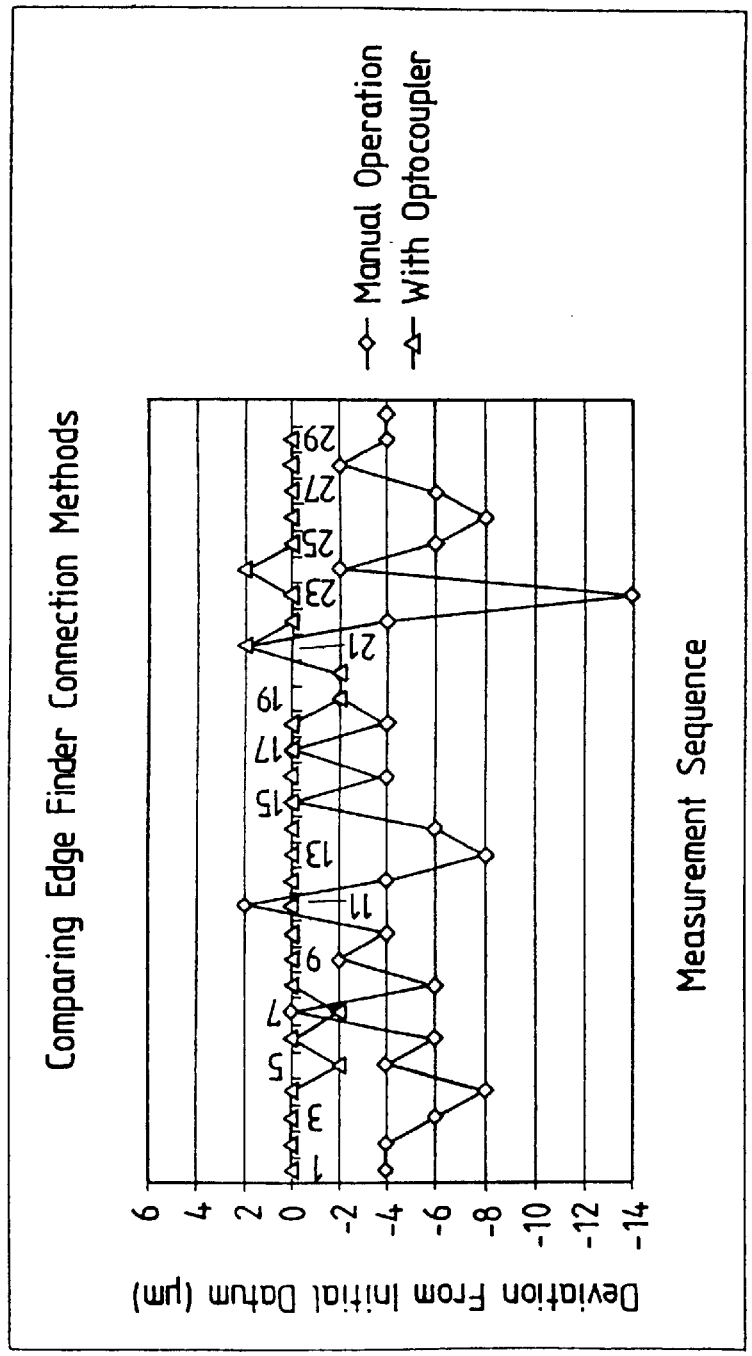
FIG. 5 illustrates a comparison of the measurement accuracy using the object detecting devices of FIGS. 1–4 with a conventional object detecting device.
Figure 6:
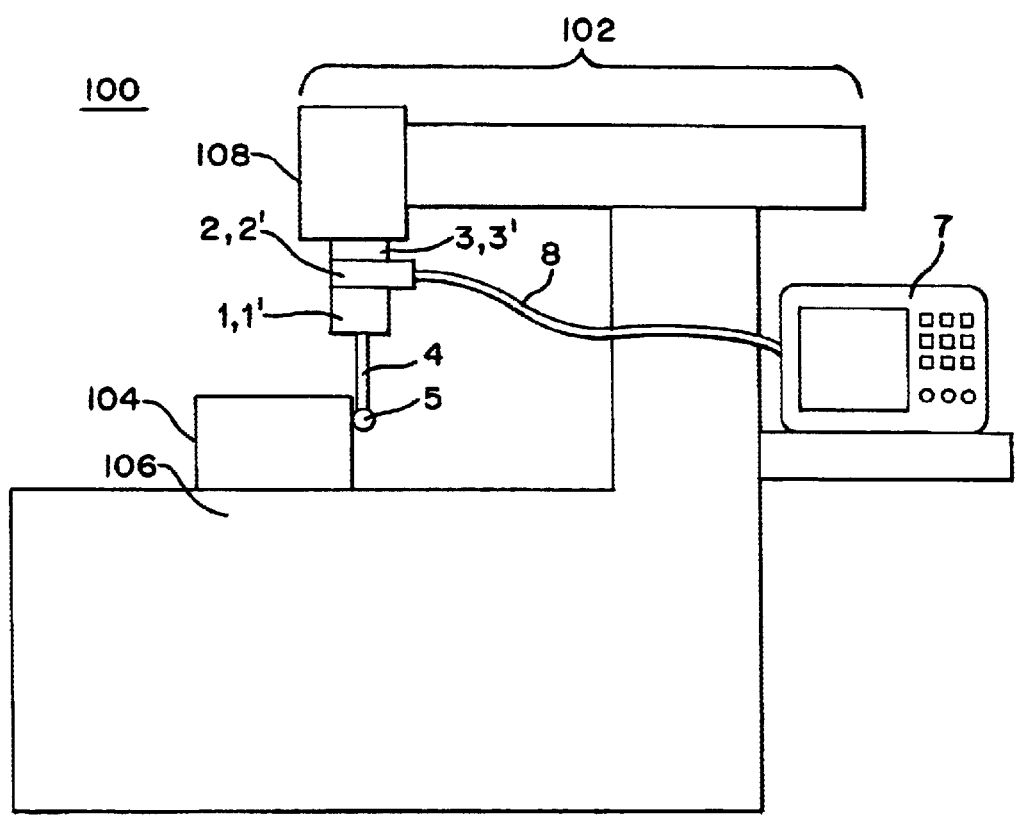
FIG. 6 illustrates an embodiment of a machine tool measuring system according to the present invention that employs the object detecting devices and detector assemblies of FIGS. 1–4.

FIG. 6 schematically shows a machine tool measuring system 100 that includes a machine tool 102 that moves relative to an object or workpiece 104 that is held in or on a workpiece holder or surface 106. The machine tool may include a position measuring system that measures the relative position between the machine tool and the workpiece holder 106. The machine tool 102 is attached to a tool holder that moves relative to the workpiece holder 106. The machine tool 102 includes an attachment device, such as chuck 108. A housing 3, 3' of an object sensing component 1, 1' is inserted into the chuck and attached to the machine tool 102 via the chuck 108. The object sensing components 1, 1' and their corresponding light detector assemblies that can be attached to the machine tool 102 are described below with respect to FIGS. 1–5.

FIG. 1 illustrates schematically an object detecting device according to an embodiment of the present invention. The object detecting device includes an object sensing component 1 and a light detector assembly 2 attached thereto. The object sensing component 1 includes a cylindrical object sensing component housing 3 and a cylindrical shaft 4 rigidly connected thereto and extending along the longitudinal axis of the housing 3. The cylindrical housing 3 is dimensioned such that it can be received by the chuck 108 of a machine tool 102.

At the outmost end of the shaft 4, a sensing ball or probe 5 is connected to the shaft 4 via a spring (not shown). The springy connection of the sensing ball 5 to the shaft 3 protects the ball from being damaged when inadvertently knocked on an object 104.

The housing 3 includes a window through which light from a light source (not shown) provided within the housing 3 is emitted. As indicated above, the light source is activated when the sensing ball 5 contacts an electrically conductive object 104 placed on an object holder 106 of a machine tool 102. Such contact closes an electrical circuit that includes the light source, the object, the sensing ball 5 and a power supply. The light detector assembly 2 is attached to the housing 3 so as to cover at least part of the window 6. Thereby, at least part of the light emitted by the light source through the window 6 is detected. Note that the sensing ball 5 can be altered so as to generate a signal via movement of the ball alone so that the presence of a non-conducting object can be sensed as well.

The light detector assembly 2 is connected to an external processing unit 7 via an electrical cable 8 so as to couple the light source to the processing unit. That is, an electrical signal is transmitted by the light detector assembly 2 to the processor unit 7 when light emitted from the light source is detected. The external processing unit 7 may receive additional signals, for example from a machine tool, to determine not only the presence of an object, such as a workpiece, but also its position and orientation. These signals may also be processed to determine the dimensions of the sensed object.

FIG. 2 illustrates schematically the light detector assembly 2 according to an embodiment of the present invention. The light detector assembly 2 includes a light detector housing 10, one side wall 11 of which is curved inwardly so as to complement the cylinder shape of the housing 3. The side wall 11 includes a transparent material (e.g. plastics) in order to allow light emitted from the light source to enter the housing 10.

Inside the housing 10, a light detector, such as photo detector 12 that may be a photo transistor, a photodiode or a photoresistor that is sensitive to visible light, is arranged at the center of the side wall 11. The photo detector 12 generates an output signal when light from the light source impinges on its photosensitive surface. The output signal is transmitted via wires 13, the cable 8, and a plug 14 to the external processing unit 7 shown in FIG. 1.

Adjacent to the photo detector in the proximity of the side wall 11, a magnetic attachment, such as magnets 15, is provided. When the detector assembly 2 is placed at the housing 3 as shown in FIG. 1, the magnetic force generated by the magnets 15 acts on the metal walls of the housing 3, thereby fixing the housing 3 and the light detector housing 10 to one another.

Figure 3:
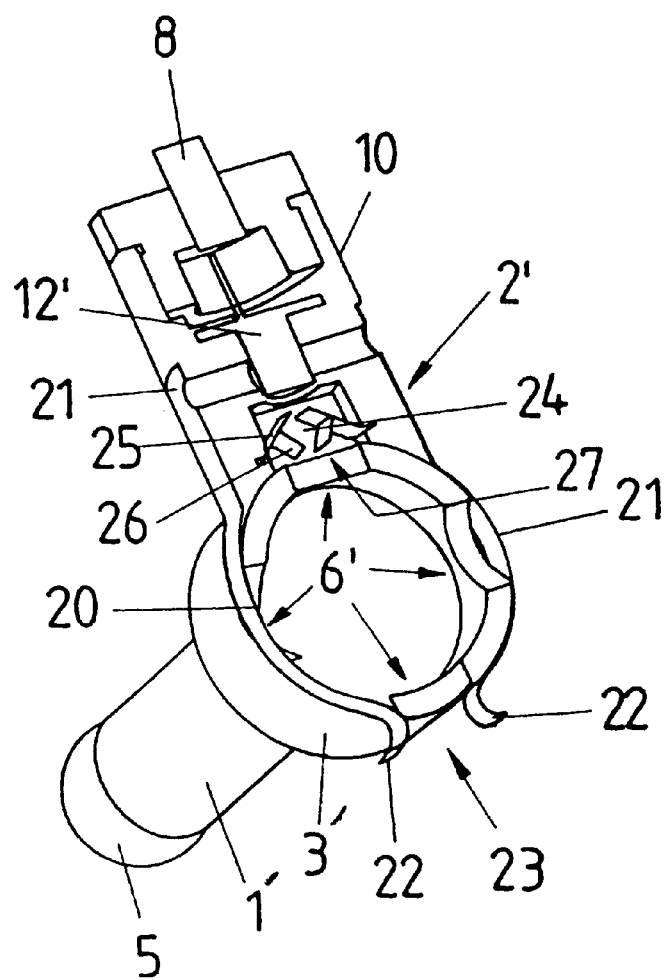
FIG. 3 illustrates a second embodiment of an object detecting device according to the present invention that uses a second embodiment of an object sensing component and a second embodiment of a detector assembly according to the present invention.

FIG. 3 illustrates schematically a section through a detector assembly 2' according to another embodiment of the present invention. The detector assembly 2' is shown attached to an embodiment of an object sensing component 1. Instead of a continuous window 6 (FIG. 1), the object sensing component element 1 includes four separate windows 6' in the outer wall of the housing 3, each radially rotated by 90° to another.

For attachment to the housing 3 of the object sensing component 1, a clamp 20 is mounted at the housing 10 of the detector assembly 2'. The clamp 20 includes two shaped springy metal strips 21 which are attached at opposite locations of the circumferential wall of the housing 10.

One end of each of the metal strips 21 protrudes from the housing 10 along the longitudinal axis of the housing 10. These ends are shaped to define a circular area between them whose diameter is the same as or slightly less than the diameter of the object sensor element housing 3. Outmost tips 22 of the metal strips 21 are bent away from one another, in between defining an opening 23. The bent tip portions 22 of the metal strips 21 facilitate insertion of the housing 3 into the clamp 20.

For assembly of the object detecting device, the object sensing component 1 is moved towards the opening 23 so that the housing 3 engages with the tips 22 of the clamp 21. Thereby, the springy metal strips 21 are forced away from one another and the housing 3 is received in the circular area defined in between the metal strips 21. When the housing 3 is fully inserted in the clamp 20 and engages with the outer surface of the detector housing 10, the metal strips 21 spring back and grip the housing 3 as illustrated in FIG. 3, thereby fixing the sensor element 1 and the detector assembly 2' firmly to one another.

In the embodiment of FIG. 3, the photo detector 12' is placed at a distance from the outer wall of the housing 10 abutting the object sensing component housing 3. In between the outer wall of the housing 3 and the photo detector 12', an aperture 24 is provided. The aperture 24 is arranged to ensure that light may impinge on the photo detector 12' only when the detector assembly 2 is attached to the object sensing component 1. Consequently, ambient light is shielded and only light by the light source of the object sensing component 1 can impinge on the photo detector 12'.

The aperture 24 is formed by a pair of shutters 25. The shutters 25 include a springy material such as sheet metal. One end of each of the shutters 25 is fixed inside the housing 3 via fixations, such as a clamp or a stationary fastening. The other (free) ends radially extend toward one another and are pivotable relative to the fixations in the housing 10.

To each of the shutters 25, an actuator 26 is mounted which extends perpendicularly from the respective shutter 25. Before assembly of the object sensing component 1 and the detector assembly 2, the shutters 25 extend substantially along one axis and shield light entering the housing through a window 27 in the housing 10. The actuators 26 extend from the housing 10 into the circular area defined between the springy metal strips 21.

Upon assembly, when the housing 3 is inserted into this circular area as described above, the outer wall of the housing 3 exerts a force on the actuators 26, thereby pushing them back inside the housing 3. Such force is transmitted via the actuators 26 to the shutters 25 such that their free ends pivot around their fixations in the housing toward the photo detector 12 and open a gap between them, as shown in FIG. 3. Thus, light from the light source in the object sensing component 1 can now enter the window 27, pass the gap between the free ends of the shutters 25, and impinge on the photo detector 12'.

During assembly, it is to be made sure that one of the windows 6' in the object sensing component housing 3 coincides with the window 27 in the light detector housing 10. If necessary, the detector assembly 2 has to be moved along or turned about the axis of the cylindrical housing 3 relative to the object sensing component 1. If the window in the housing 3 is continuous (such as window 6 in FIG. 1), such adjustment is facilitated and necessary only along the axis of housing 3. Where required, a test run may be performed to determine whether the sensing of an object by the object sensing component 1 makes the photo detector 12' generate an output signal, thus indicating correct adjustment.

Figure 4:
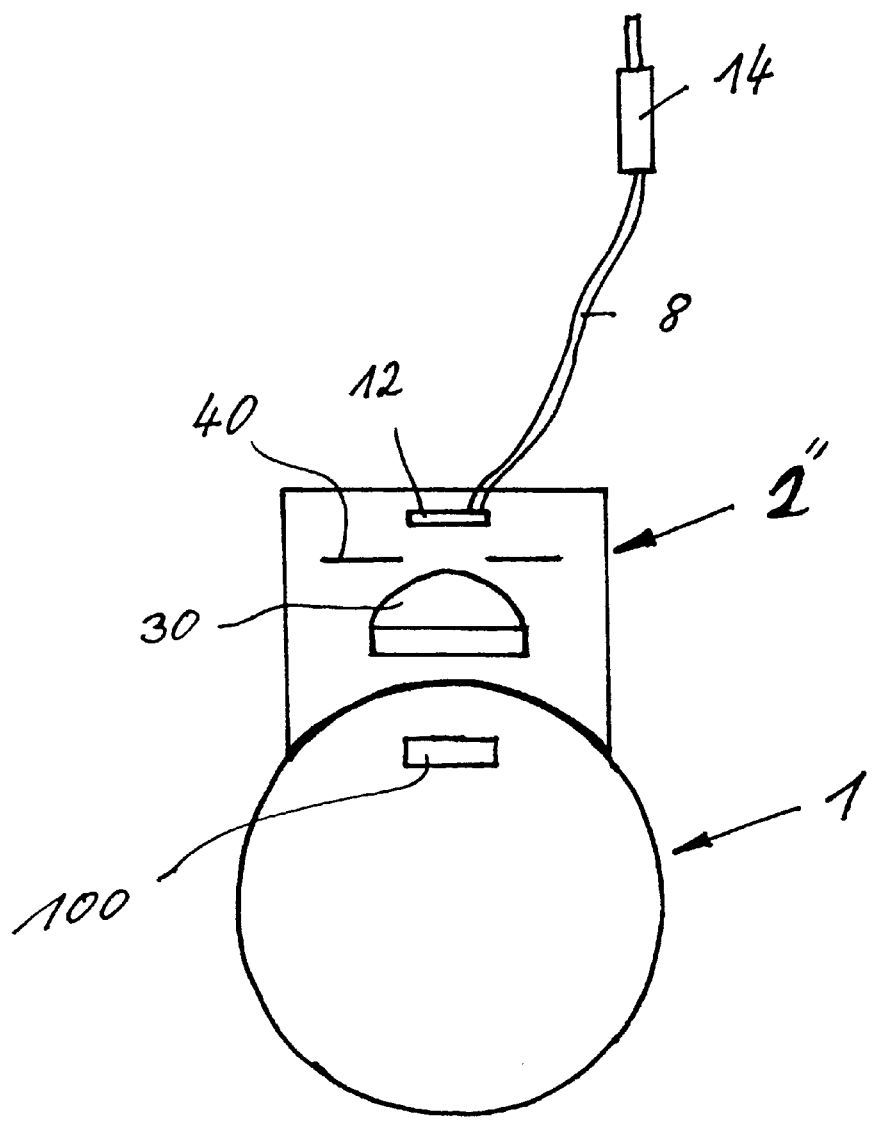
FIG. 4 illustrates a third embodiment of an object detecting device according to the present invention that uses an object sensing component with a detector assembly.

FIG. 4 illustrates schematically a further object detecting device according to an embodiment of the present invention. The object detecting device includes the object sensing component 1 of FIG. 1 and an embodiment of a light detector assembly 2 attached thereto. In this embodiment, a lens 30 is arranged in the light detector assembly 2 before the light detector, such as photo detector 12, to focus the visible light from the light source 100 on the photo detector 12. An aperture 40 is arranged between the lens 30 and the photo detector 12, so that only focused light from the light source 100 reaches the photo detector 12.

FIG. 5 illustrates a comparison of the measurement accuracy using the object detecting devices of FIGS. 1–4 embodying the present invention with a conventional object detecting device. As can be seen, the deviation from a reference value (initial datum) is greatly reduced as compared with a conventional device involving manual operation.

The foregoing detailed description is merely illustrative of several physical embodiments of the invention. Physical variations of the invention, not fully described in the specification, may be encompassed within the purview of the claims. Accordingly, any narrower description of the elements in the specification should be used for general guidance, rather than to unduly restrict any broader descriptions of the elements in the following claims.

I claim:

1. A detector assembly for sensing an object comprising:
   an object sensing component comprising:
   a probe for contacting an object; and
   a light source that emits light upon said probe contacting said object;
   a light detector attached to said object sensing component, wherein said light detector detects said emitted light and generates an electrical signal.

2. The detector assembly of claim 1, further comprising:
a light detector housing that contains said light detector, said light detector housing comprises an aperture that opens upon attachment to said object sensing component and closes upon removal of said light detector housing from said object sensing component.

3. The detector assembly of claim 1, further comprising a processing unit connected to said light detector for processing said electrical signal generated by said light detector.

4. The detector assembly of claim 1, further comprising a magnetic attachment that generates a magnetic force.

5. The detector assembly of claim 2, wherein a clamp is mounted to said light detector housing.

6. The detector assembly of claim 2, wherein said aperture is formed by at least one shutter operable by a force acting on at least one actuator associated with said at least one shutter, wherein said at least one actuator projects from said light detector housing such that a force is applied thereon by said object sensing component when said light detector housing is attached thereto.

7. The detector assembly of claim 1, wherein a lens is arranged before said light detector.

8. The detector assembly of claim 7, wherein an aperture is arranged between said lens and said light detector.

9. An object detecting device for sensing an object, comprising:
an object sensing component housing;
a light source arranged at or in said object sensing component housing;
a probe arranged at said object sensing component housing and contacting said object thereby to detect presence of said object and causing said light source to emit light; and
a light detector that detects said light and generates an electrical signal dependent on said detected light and comprises a light detector housing attached to said object sensing component housing, said light detector connected to a processing unit for processing said electrical signal generated by said light detector.

10. The object detecting device of claim 9, wherein said light detector housing is attached to said object sensing component housing by magnetic force.

11. The object detecting device of claim 10, wherein said object sensing component housing is of metal and said light detector housing comprises one or more magnets to interact with said metal of said object sensing component housing.

12. The object detecting device of claim 10, wherein said object sensing component housing comprises a metal portion and said light detector housing comprises one or more magnets to interact with said metal portion of said object sensing component housing.

13. The object detecting device of claim 9, wherein a side of said object sensing component housing and a side of said light detector housing contact one another and are shaped complementarily to each another.

14. The object detecting device of claim 13, wherein said object sensing component housing is cylindrical, and said side of said light detector housing is curved inversely to said side of said object sensing component housing.

15. The object detecting device of claim 9, wherein said object sensing component housing comprises a window, and said light source is arranged within said object sensing component housing to emit light through said window.

16. The object detecting device of claim 9, wherein said light detector is formed by a photo transistor, photodiode or photoresistor sensitive for visible light.

17. The object detecting device of claim 9, wherein a lens is arranged in said light detector housing before said light detector to focus said light onto said light detector.

18. The object detecting device of claim 17, wherein an aperture is arranged between said lens and said light detector.

19. The object detecting device of claim 9, wherein contact between said probe and said object closes an electrical circuit that includes said light source and results in said light source emitting light.

20. An object detecting device for sensing an object, comprising:
a housing;
a light source arranged at or in the housing, for indicating that an object has been sensed;
a probe arranged at the housing, and contacting said object thereby to detect presence of said object and causing said light source to emit light; and
a light detector attached to said housing at a position to detect said light emitted from said light source.

21. The object detecting device of claim 20, wherein said light detector is connected to an external processing unit for processing electrical signals generated by said light detector.

22. The object detecting device of claim 20, wherein a lens is arranged before said light detector to focus said light emitted from said light source onto said light detector.

23. The object detecting device of claim 22, wherein an aperture is arranged between said lens and said light detector.

24. The object detecting device of claim 20, wherein contact between said probe and said object closes an electrical circuit that includes said probe, said light source, said object and a power supply.

25. An object detecting device comprising:
a housing;
a light source at or in the housing, for indicating that an object has been sensed;
a probe linked to said light source, for sensing said object and for activating said light source when said object is sensed; and
a light detector assembly attached to said housing for coupling said light source with a processing unit.

26. A machine tool measuring system, comprising:
an object on a holder;
a machine tool that moves relative to said holder;
an object detecting device comprising:
a housing attached to said machine tool;
a light source at or in the housing, for indicating that said object has been sensed;
a probe linked to said light source, for sensing said object and for activating said light source when said object is sensed; and
a light detector assembly attached to said housing for coupling said light source with a processing unit.

27. The machine tool measuring system of claim 26, wherein said machine tool comprises an attachment device that attaches said object sensing component to said machine tool.

28. The machine tool measuring system of claim 27, wherein said attachment device comprises a chuck.

29. The machine tool measuring system of claim 26, further comprising a position measuring system that measures the relative position between said machine tool and said holder.

* * * * *